United States Patent
Ohmori et al.

(10) Patent No.: US 7,914,877 B2
(45) Date of Patent: Mar. 29, 2011

(54) CERAMIC THIN PLATE MEMBER

(75) Inventors: Makoto Ohmori, Nagoya (JP); Natsumi Shimogawa, Nagoya (JP); Takahiro Maeda, Ichinomiya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 246 days.

(21) Appl. No.: 11/843,208

(22) Filed: Aug. 22, 2007

(65) Prior Publication Data
US 2008/0050558 A1 Feb. 28, 2008

(30) Foreign Application Priority Data

Aug. 25, 2006 (JP) .................................. 2006-229547

(51) Int. Cl.
*B32B 9/00* (2006.01)
(52) U.S. Cl. .......................... 428/141; 428/701; 428/702
(58) Field of Classification Search .................. None
See application file for complete search history.

(56) References Cited

U.S. PATENT DOCUMENTS

| 5,273,837 | A | | 12/1993 | Aitken et al. |
| 5,480,737 | A | * | 1/1996 | Satake et al. .................... 429/30 |
| 2002/0012825 | A1 | | 1/2002 | Sasahara et al. |
| 2003/0012995 | A1 | | 1/2003 | Hara et al. |
| 2004/0161650 | A1 | | 8/2004 | Robert |

FOREIGN PATENT DOCUMENTS

| JP | 2004-342584 A1 | 12/2004 |
| WO | 2006/005066 | 1/2006 |

* cited by examiner

*Primary Examiner* — Timothy Speer
(74) *Attorney, Agent, or Firm* — Burr & Brown

(57) ABSTRACT

A thin plate member has a uniform thickness of not less than 5 μm and not more than 100 μm, includes at least a ceramic sheet, formed by sintering. The thin plate member has plural convex portions protruding from one plane P of the thin plate member, and plural concave portions caved in from the plane P. Accordingly, the deflection amount obtained when the thin plate member is supported at a predetermined support section of the thin plate member in a direction orthogonal to the plane P is smaller than the deflection amount of a thin plate member that is flat without having convex and concave portions. Therefore, a thin plate member which is difficult to be deformed is provided.

22 Claims, 13 Drawing Sheets (A)

(B)

(A)

(B)

(A)

(B)

(C)

(D)

CERAMIC THIN PLATE MEMBER

BACKGROUND OF THE INVENTION

1. Field of the Invention

The present invention relates to a sintered thin plate member containing a ceramic sheet, and having a uniform thickness of not less than 5 µm and not more than 100 µm.

2. Description of the Related Art

Conventionally, a sintered thin plate member containing a ceramic sheet has been used for various apparatuses such as a sensor, actuator, and unit cell of a solid oxide fuel cell (SOFC), etc. (see Japanese Unexamined Patent Application No. 2004-342584).

The thin plate member used for these apparatuses is extremely thin in order to achieve an object to downsize the apparatus. Therefore, the thin plate member is deformed due to external force during the process of installing the thin plate member into the apparatus or after the thin plate member is installed into the apparatus, thereby entailing various problems. For example, when the thin plate member described above is used as a unit cell of an SOFC, since the fuel flow path or air flow path formed at the portion opposite to the thin plate member is extremely narrow, a problem that the deformed thin plate member closes these flow paths might arise. Even if the thin plate member is not deformed to such a degree that closes the flow paths, there arises a problem that the pressure loss produced when fluid such as air or fuel flows through the flow paths will occur due to the deformation of the thin plate member. Accordingly, one of the objects of the present invention is to provide a sintered thin plate member that is difficult to be deformed with respect to external force. Further, another one of the objects of the present invention is to provide a thin plate member that is difficult to be deformed with respect to an internal stress caused by a difference in a thermal expansion coefficient between layers, when the sintered thin plate member is a laminate member.

SUMMARY OF THE INVENTION

In order to achieve the foregoing objects, the thin plate member according to the present invention contains at least a ceramic sheet, and is formed by sintering.

Further, this thin plate member has a uniform thickness of not less than 5 µm and not more than 100 µm (i.e., 5-100 µm), and has plural convex portions that protrude from one plane of the thin plate member and plural concave portions that are caved in from the same plane, wherein a deflection amount caused when the thin plate member is supported at a predetermined support section thereof and a load having a predetermined magnitude is applied to a load applying section, which is other than the support section, of the thin plate member in the direction orthogonal to the plane is smaller than a deflection amount caused when a thin plate member, which is supposed to be flat without having the convex portions and the concave portions, is supported at the predetermined support section thereof and the load having the predetermined magnitude is applied to the load applying section, which is other than the support section, of the supposed thin plate member in the direction orthogonal to the plane.

The inventor of the present invention has succeeded in forming plural convex portions and concave portions to the "sintered thin plate member containing a ceramic sheet" having a uniform thickness of not less than 5 µm and not more than 100 µm. Further, the present inventor has found that the deflecting amount of the thin plate member, having the convex portions and concave portions described above, with respect to the predetermined load is smaller than the deflection amount of the conventional thin plate member, having no convex portions and concave portions (the conventional thin plate member which has conditions, such as the material, and thickness, etc., except convex portions and concave portions, that are the same as those of the thin plate member in the present invention), with respect to the predetermined load. In other words, the present invention can provide a thin plate member that is difficult to be deformed by the external force.

In the thin plate member described above, at least one of the plural convex portions is preferably formed such that the top position at the uppermost point of the convex portion continuously extends in the direction along the plane, and at least one of the plural concave portions is preferably formed such that the bottom at the lowermost position of the concave portion continuously extends in the direction along the plane.

As described above, when the convex portion has "a shape of a mountain range having its longitudinal direction in the predetermined direction along the plane of the thin plate member" and the concave portion has "a groove-like shape having its longitudinal direction in the predetermined direction along the plane of the thin plate member", "the sintered thin plate member containing a ceramic sheet" that is more difficult to be deformed with respect to the external force is thereby provided. Note that the convex portions and concave portions viewed from one surface of the thin plate member are regarded as the concave portions and convex portions respectively viewed from the other surface of the thin plate member. Further, the shape of the convex portions in the form of the mountain range and/or groove-like concave portions viewed from the top (viewed from above) of the thin plate member (i.e., the shape in a plane view of the thin plate member) may be linear or curved.

In the thin plate member described above, it is preferable that the top-bottom average distance, which is the sum of the top distance average value obtained by simply averaging "the distances from the tops positioned at the uppermost point of the plural convex portions to the plane" and "the bottom distance average value obtained by simply averaging the distances from the bottoms positioned at the uppermost point of the plural concave portions to the plane", is not less than 20 µm and not more than 400 µm (20-400 µm).

According to the examination, it has been found that, when the top-bottom distance average value becomes not less than 20 µm, external force necessary for producing the same deflection amount on the thin plate member increases (see FIG. 10). In other words, it has been found that, when the top-bottom distance average value becomes not less than 20 µm, the thin plate member is extremely difficult to be deformed by the external force. On the other hand, when the top-bottom distance average value becomes not more than 400 µm, it has been found that microcracks might occur on the thin plate member which is a sintered body, due to the increase in the curvature of the concave portions and the convex portions formed on the surface of the thin plate member. When the microcracks occur, the strength of the thin plate member is extremely reduced. In views of the foregoing, it is preferable that the top-bottom distance average value be not less than 20 µm and not more than 400 µm.

In this case, the thin plate member preferably includes at least a pair of the convex and concave portions, which is composed of one of the plural convex portion and one of the plural concave portion adjacent to the one convex portion, and the distance between the top of the one convex portion and the bottom of the one concave portion in the direction along the plane (hereinafter referred to as "top-bottom distance in plane direction") is not less than 0.05 mm and not more than 1.00 mm (0.05-1.00 mm).

According to the examination, it has been found that, when the top-bottom distance in plane direction becomes not more than 1.00 mm, external force necessary for producing the same deflection amount on the thin plate member increases (see FIG. 11). In other words, it has been found that, when the top-bottom distance in the plane direction becomes not more than 1.00 mm, the thin plate member is extremely difficult to be deformed by the external force. On the other hand, when the top-bottom distance in plane direction is less than 50 μm, and thus, the convex portion and the concave portion are very close to each other, it has been found that microcracks might occur on the thin plate member which is a sintered body. When the microcracks occur, the strength of the thin plate member is extremely reduced. From the above views, the top-bottom distance in plane direction is preferably not less than 0.05 mm (50 μm) and not more than 1.00 mm (1000 μm).

The thin plate member described above may be made of a single ceramic sheet, or may be a laminate member comprising a ceramic sheet and a sheet made of a material having a thermal expansion coefficient different from that of the ceramic sheet.

Especially, when the thin plate member is a laminate member comprising a ceramic sheet and a sheet made of a material having a thermal expansion coefficient different from that of the ceramic sheet, the thin plate member is not only difficult to be deformed by the external force but also is difficult to be deformed if internal stress occurs. Specifically, when the thin plate member which is a laminate member is held under a high-temperature environment, or when the thin plate member is used under the environment where a temperature difference is applied to the thin plate member (e.g., under the environment where one side is heated), internal stress caused by the difference in the thermal expansion coefficient between layers occurs. However, since the thin plate member according to the present invention has concave portions and convex portions, it provides an effect of being difficult to be deformed even if the internal stress occurs.

When the thin plate member is a laminate member comprising a ceramic sheet and a sheet made of a material having a thermal expansion coefficient different from that of the ceramic sheet, the thin plate member may be configured in such a manner that the ceramic sheet is solid electrolyte zirconia, a fuel electrode is formed on one surface of the solid electrolyte zirconia, and an air electrode is formed on the other surface of the solid electrolyte zirconia. This configuration provides a unit cell for an SOFC that is difficult to be deformed by the external force.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
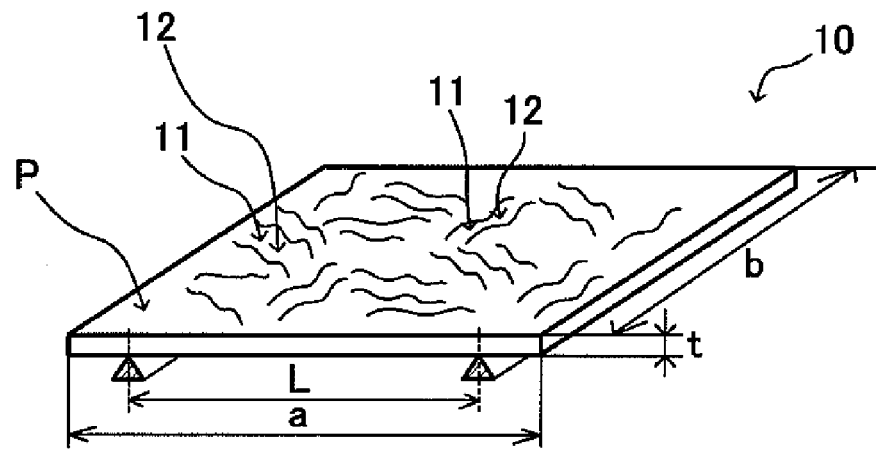
FIG. 1 is a perspective view of a thin plate member according to one embodiment of the present invention.

A thin plate member 10 shown in FIG. 1 according to an embodiment of the present invention comprises zirconia that is one type of ceramic. The thin plate member 10 is rectangle (including a square shape) viewed in a plane. The width (the length of one side) a of the thin plate member 10 and the depth (the length of the other side) b are not less than 5 mm and not more than 300 mm (5-300 mm).

The thickness t of the thin plate member 10 is entirely uniform, and the thickness t is not less than 5 μm and not more than 100 μm (e.g., 30 μm). When the thickness t of the thin plate member 10 becomes less than 5 μm, it is difficult to form a uniform ceramic green sheet for forming the thin plate member 10, and further, a crack is produced due to a setter hold during the sintering and contraction. The reason why the thickness t of the thin plate member 10 is not more than 100 μm is because, when the thickness t of the thin plate member 10 exceeds 100 μm, the rigidity of the thin plate member 10 itself increases, so that a remarkable effect for preventing the deflection by the formation of convex portions 11 and concave portions 12 (corrugated wrinkle) cannot be provided.

Figure 2:
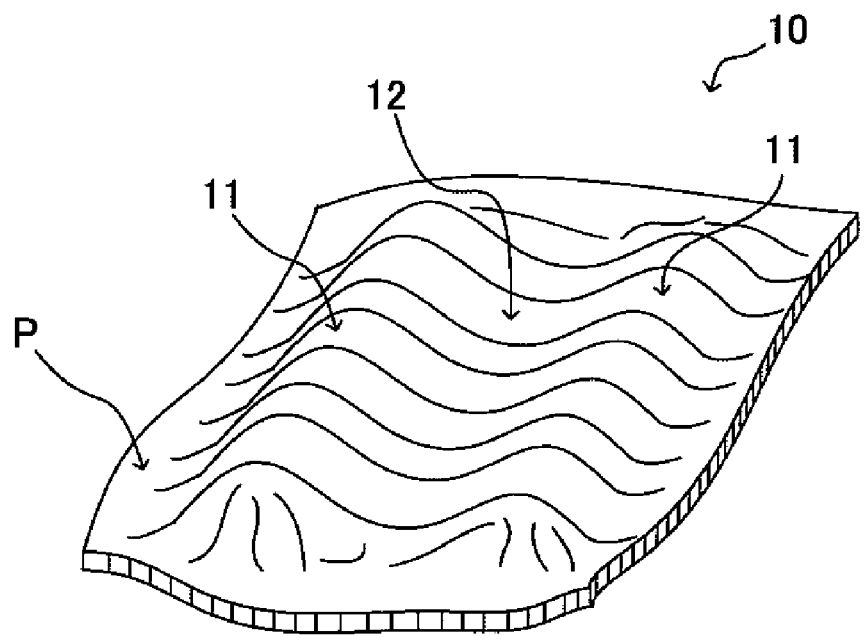
FIG. 2 is a partially enlarged perspective view showing convex portions and concave portions provided at the thin plate member shown in FIG. 1.

As shown in FIG. 1 and FIG. 2 that is a partial enlarged view of the thin plate member 10, the thin plate member 10 has plural convex portions 11 protruding from one plane (e.g., either one of a front surface and back surface) P of the thin plate member 10 and plural concave portions 12 caved in from the plane P, in such a manner that few are offset in the distribution of the convex portions 11 and concave portions 12 on the plane P (the convex portions 11 and the concave portions 12 are uniformly formed). These convex portions 11 and the concave portions 12 can also be referred to as a ridge, corrugated wrinkle, and rib.

As shown in FIG. 2, at least one convex portion of the plural convex portions 11 is formed such that its top 11a (see FIG. 5a) positioned at the uppermost portion thereof extends (continuously) in the direction along the plane P by a predetermined distance. Specifically, at least one of the plural convex portions has "a shape of a mountain range having its longitudinal direction in the predetermined direction along the plane P of the thin plate member 10". Similarly, at least one of the plural concave portions 12 is formed such that its bottom 12a (see FIG. 5a) positioned at the lowermost portion thereof continuously extends in the direction along the plane P (the direction parallel to the plane P). Specifically, at least one of the plural concave portions has "a groove-like shape having its longitudinal direction in the predetermined direction along the plane P of the thin plate member 10".

Figure 3:
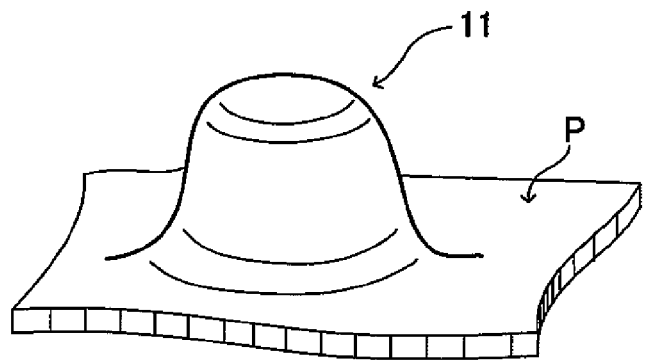
FIG. 3 is a perspective view showing another example of the convex portion provided at the thin plate member shown in FIG. 1.
Figure 4:
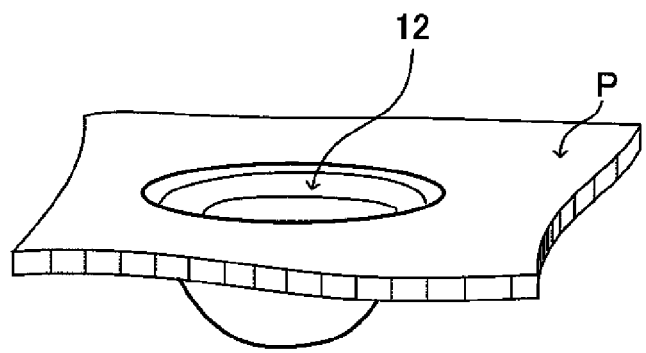
FIG. 4 is a perspective view showing another example of the concave portion provided at the thin plate member shown in FIG. 1.

As shown in FIG. 3, the convex portion 11 may have a shape of a truncated cone. Similarly, the concave portion 12 may have a shape of a truncated cone as shown in FIG. 4.

Figure 5:
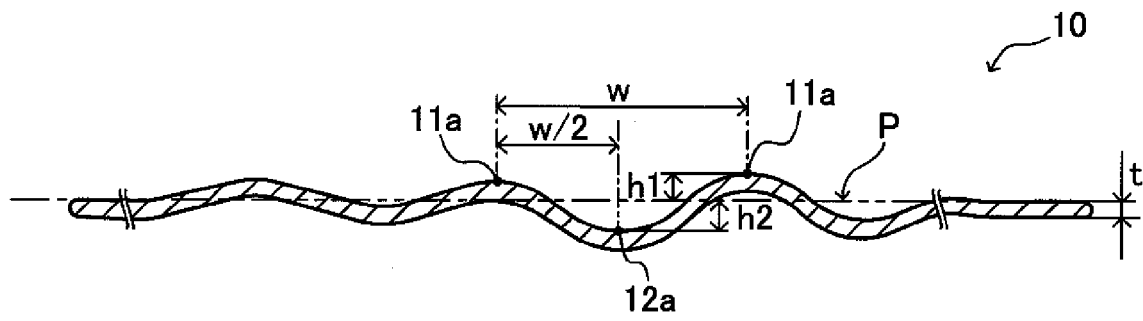
FIG. 5 is a sectional view of the thin plate member shown in FIG. 1.

The top-bottom distance average value, which a sum of "the top distance average value obtained by simply averaging the distances h1 of the tops 11a of the plural (all) convex portions 11 from the plane P shown in FIG. 5" and "the bottom distance average value obtained by simply averaging the distances h2 of the bottoms 12a of the plural (all) concave portions 12 from the plane P shown in FIG. 5", is not less than 20 μm and not more than 400 μm (20-400 μm).

The thin plate member 10 includes at least "a pair of convex portions and concave portions" composed of at least one convex portion of the plural convex portions and at least one concave portion of the plural concave portions adjacent to the one convex portion, wherein the distance (w/2) between the top 11a of the one convex portion and the bottom 12a of the one concave portion in the direction along the plane P is not less than 0.05 mm and not more than 1.00 mm (0.05-1.00 mm).

Here, the thin plate member 10 that is difficult to be deformed by the formation of the convex portions 11 and the concave portions 12 on the thin plate member 10 was examined.

Figure 6:
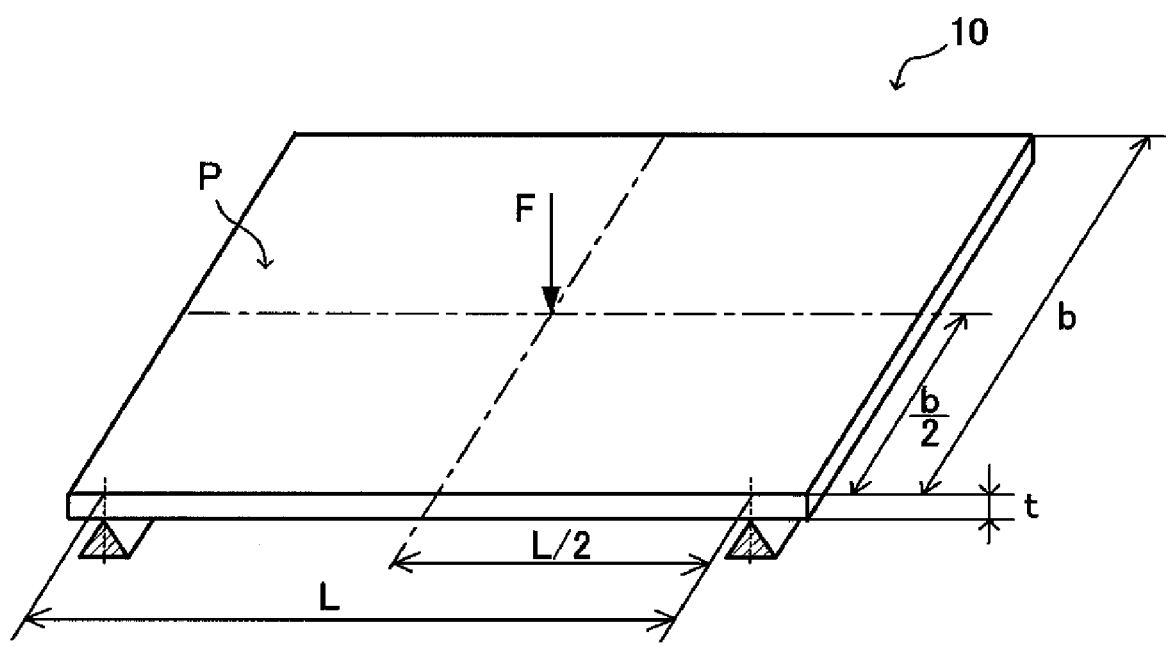
FIG. 6 is a perspective view of the thin plate member indicating the size and the load applying portion of the thin plate member.
Figure 7:
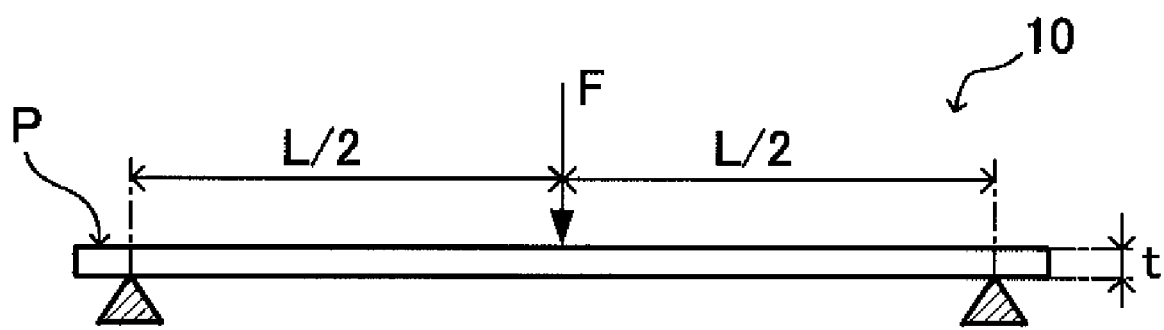
FIG. 7 is a front view of the thin plate member shown in FIG. 6.

For this examination, as shown in FIGS. 6 and 7, the portions in the vicinity of both ends of the thin plate member 10 are supported at a space L (specifically, the length of a beam is defined as L), and a load F in the direction orthogonal to the plane P of the thin plate member 10 is applied to the thin plate member 10. The point (load applying portion) where the load F is applied is a center of the thin plate member 10 (at the position apart from two support portions by L/2, and at the position apart from the near or far side in the depth direction by b/2). In the sample of the thin plate member 10, the distance L is 40 mm, the distance b is 30 mm, and the thickness t is 30 μm. The material of the thin plate member 10 is zirconia.

Figure 8:
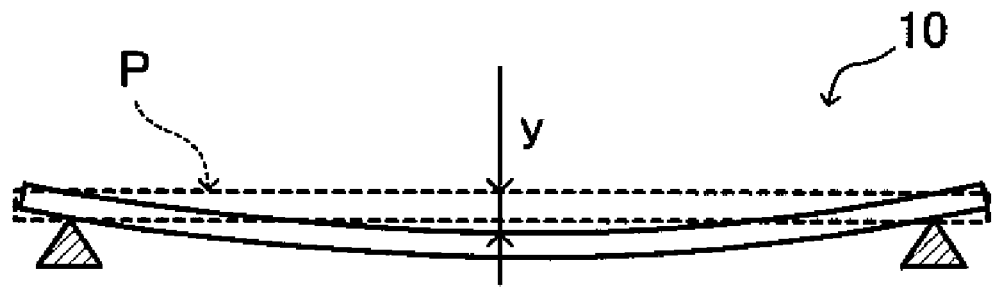
FIG. 8 is a front view of the thin plate member when the thin plate member shown in FIG. 6 is deformed.

Supposing that the convex portions 11 and the concave portions 12 are not present on the thin plate member 10, and the deflection amount in the direction orthogonal to the plane P (the direction of the load F) at the position where the load F is applied is defined as y as shown in FIG. 8, the deflection amount y can be expressed by the equation (1) described below from the viewpoint of the strength of materials. In the following description, the thin plate member having no convex portions 11 and the concave portions 12 is referred to as a virtual thin plate member.

[Equation 1]

$$y = -\frac{F \cdot L^3}{48 \cdot E \cdot I} \quad (1)$$

E: Young's modulus
I: Sectional secondary moment

The sectional secondary moment I is expressed by the equation (2).

[Equation 2]

$$I = \frac{b \cdot t^3}{12} \quad (2)$$

Therefore, the deflection amount y is expressed by the equation (3) described below by substituting the equation (2) in the equation (1).

[Equation 3]

$$y = -\frac{F \cdot L^3}{4 \cdot E \cdot b \cdot t^3} \quad (3)$$

Supposing that the load F and Young's modulus E (E=200 GPa in the case of zirconia) are constant, it is understood from the equation (3) that the deflection amount y is proportional to the third power of the length L of the beam, inversely proportional to the length b of the depth and inversely proportional to the third power of the thickness t of the thin plate member. Here, assuming that the length L of the beam and the length b of the depth are constant, the deflection amount y is inversely proportional to the third power of the thickness t. Therefore, the relationship between the deflection amount y and the thickness t is represented by a curve C1 indicated by a broken line in FIG. 9.

Figure 9:
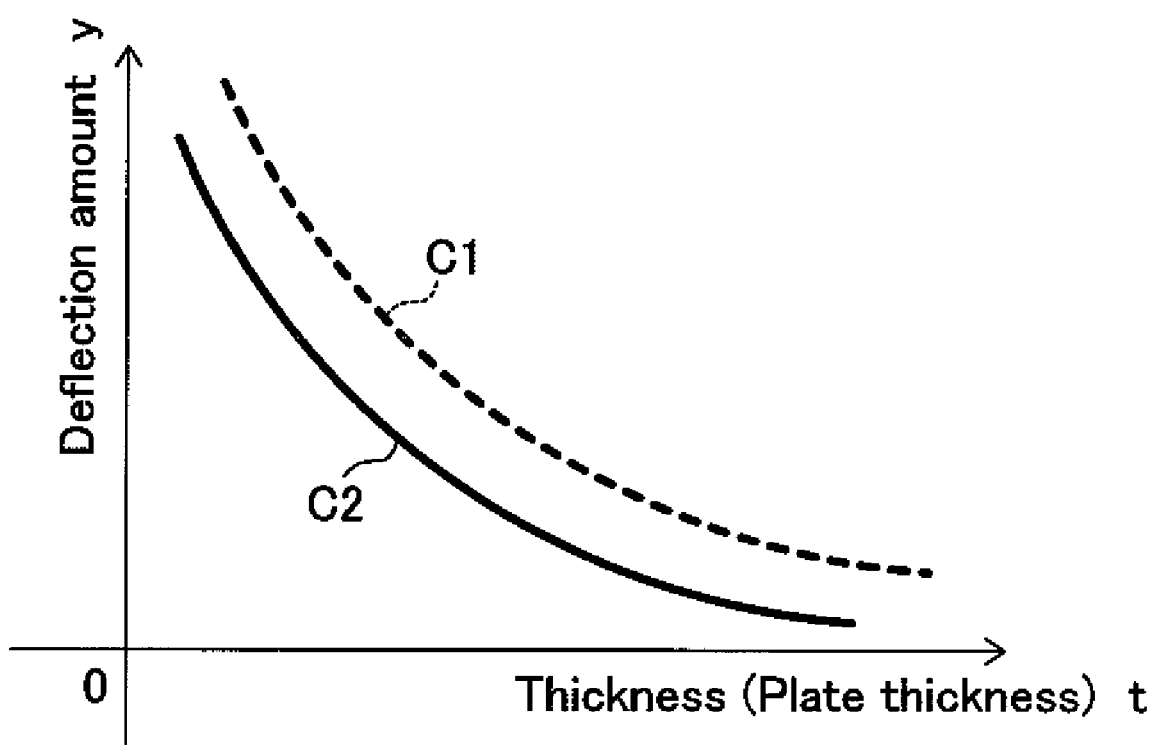
FIG. 9 is a graph showing a relationship between the thickness and deflection amount of a virtual thin plate member having no convex portion and concave portion and a relationship between the thickness and deflection amount of the thin plate member having the convex portions and the concave portions according to the present invention.

On the other hand, in the thin plate member 10 provided with the aforesaid convex portions 11 and the concave portions 12, even if the load F, Young's modulus E, length L of the beam and the length b of the depth are equal to those of the virtual thin plate member, the relationship between the deflection amount y and the thickness t changes as represented by a curve C2 indicated by a solid line in FIG. 9. Specifically, the deflection amount y of the thin plate member 10 having the convex portions 11 and the concave portions 12 becomes smaller than the deflection amount y of the virtual thin plate member whose thickness t is the same as that of the thin plate member 10.

For example, when the load F necessary for deflecting the virtual thin plate member by 1 mm (y=1 mm) is actually measured, the load F is 1.5 gram-weights.

On the other hand, when the load F necessary for deflecting the thin plate member 10 having the convex portions 11 and the concave portions 12 by 1 mm (y=1 mm) is actually measured, the load F is 78.3 gram-weights. Specifically, the load necessary for deflecting the thin plate member 10 by a predetermined amount is extremely greater than the load necessary for deflecting the virtual thin plate member by the predetermined amount.

Figure 10:
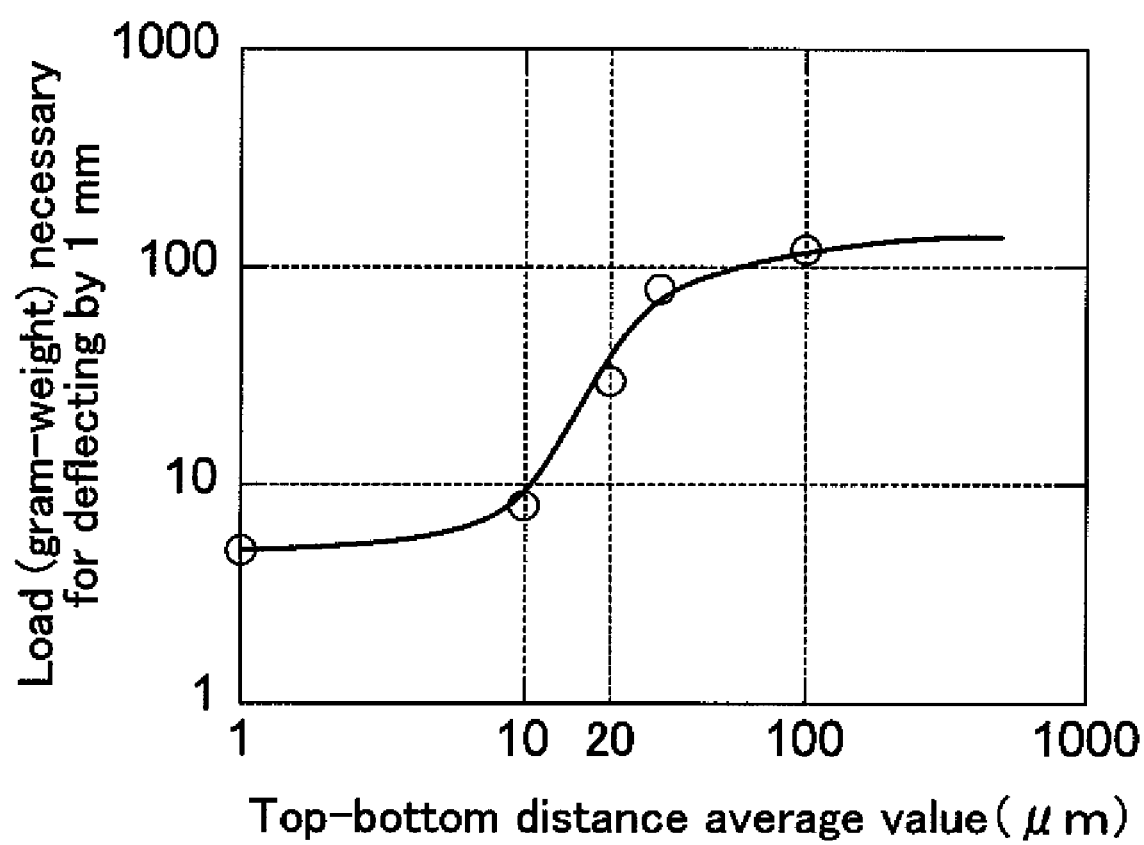
FIG. 10 is a graph showing a relationship between a top-bottom distance average value and a load necessary for deflecting a ceramic thin plate member by a predetermined amount.

The relationship between "the top-bottom distance average value" and the "load necessary for deflecting the ceramic thin plate member by 1 mm" was examined. The result is shown in FIG. 10. It is understood from FIG. 10 that, when the top-bottom distance average value becomes not less than 20 μm, the load sharply increases. On the other hand, when the top-bottom distance average value becomes not more than 400 μm, microcracks are produced on the thin plate member which is a sintered body, due to the increase in the curvature of the concave portions and the convex portions formed on the surface of the thin plate member, resulting in that the strength of the thin plate member becomes extremely small. From the above, the top-bottom distance average value is preferably not less than 20 μm and not more than 400 μm (20-400 μm).

Figure 11:
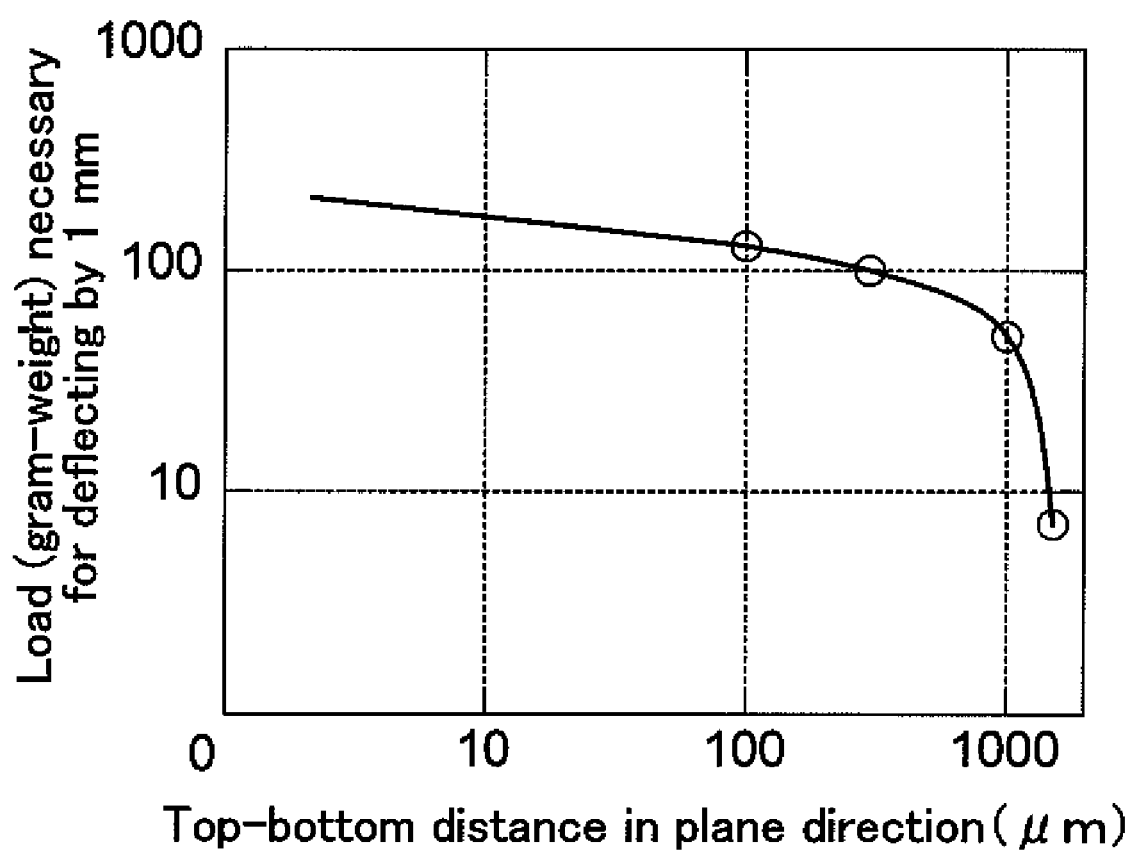
FIG. 11 is a graph showing a relationship between a top-bottom distance in plane direction and a load necessary for deflecting a ceramic thin plate member by a predetermined amount.

Further, the relationship between "the distance (w/2) between the top 11a of one convex portion and the bottom 12a of one concave portion in the direction along the plane P (i.e., the top-bottom distance in plane direction)" and "the load necessary for deflecting the ceramic thin plate member by 1 mm" was examined. The result is shown in FIG. 11. It is understood from FIG. 11 that, when the top-bottom distance in plane direction becomes not more than 1000 μm (1.00 mm), the load sharply increases. Accordingly, a thin plate member 10 that is difficult to be deformed can be obtained by setting the top-bottom distance in plane direction to be not more than 1000 μm (1 mm). On the other hand, when the top-bottom distance in plane direction is less than 50 μm, and thus, the convex portion 11 and the concave portion 12 are made very close to each other, microcracks are produced on the thin plate member which is a sintered body, whereby a thin plate member having extremely small strength is provided. From the above, the top-bottom distance in plane direction is preferably not less than 50 μm and not more than 1 mm (50 μm-1 mm).

Next, a method of manufacturing the thin plate member 10 will be explained.

First Example of Manufacturing Method

Figure 12:
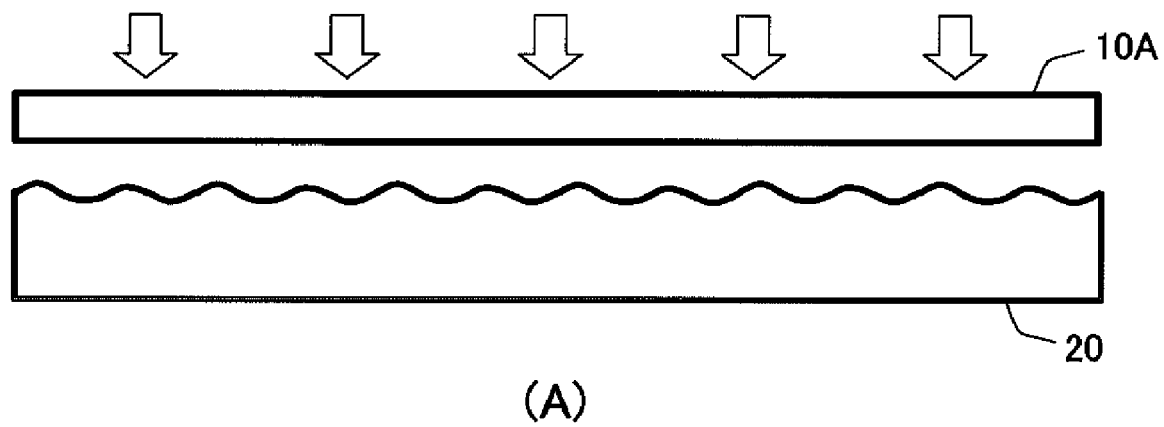
FIG. 12 is a process drawing of a first example of a manufacturing method of the thin plate member according to the present invention.
Figure 12:
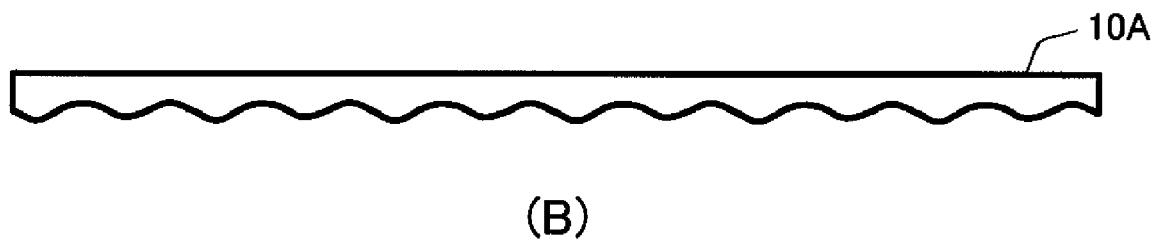

In the first example of the manufacturing method, a ceramic green sheet 10A and a mold 20 are firstly prepared as shown in (A) of FIG. 12. The mold 20 has rise and fall (wave undulation) formed on the upper surface of the mold 20 for forming the convex portions 11 and the concave portions 12. Subsequently, the green sheet 10A is pressed against the upper surface of the mold 20. As a result, rise and fall which will become the convex portions 11 and the concave portions 12 are formed on one surface of the green sheet as shown in (B) of FIG. 12. Then, this green sheet 10A is sintered under a predetermined sintering condition (e.g., at 1400° C. for one hour). As a result, the thin plate member 10 having the convex portions 11 and the concave portions 12, shown in FIG. 1, is formed.

Second Example of Manufacturing Method

Figure 13:
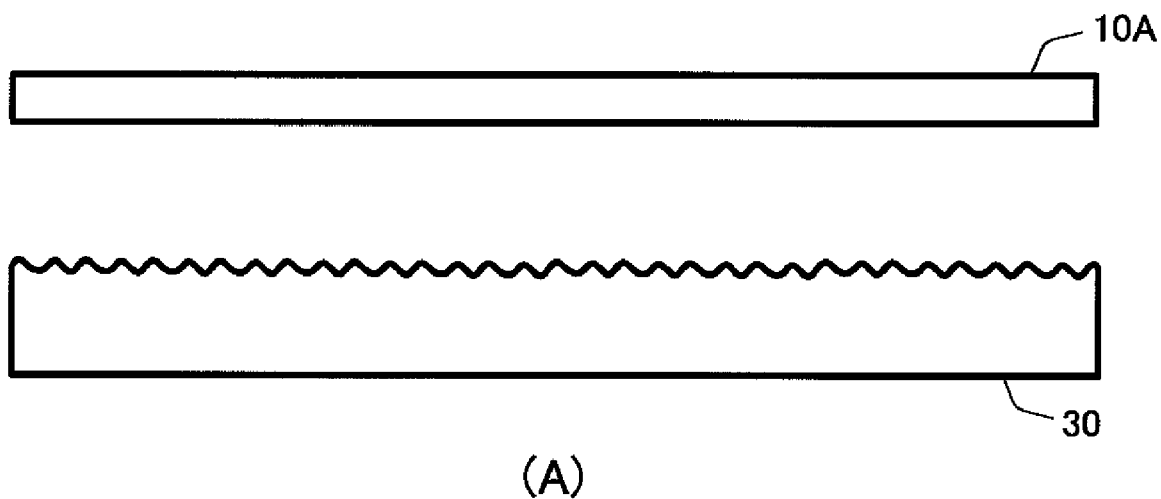
FIG. 13 is a process drawing of a second example of a manufacturing method of the thin plate member according to the present invention.
Figure 13:
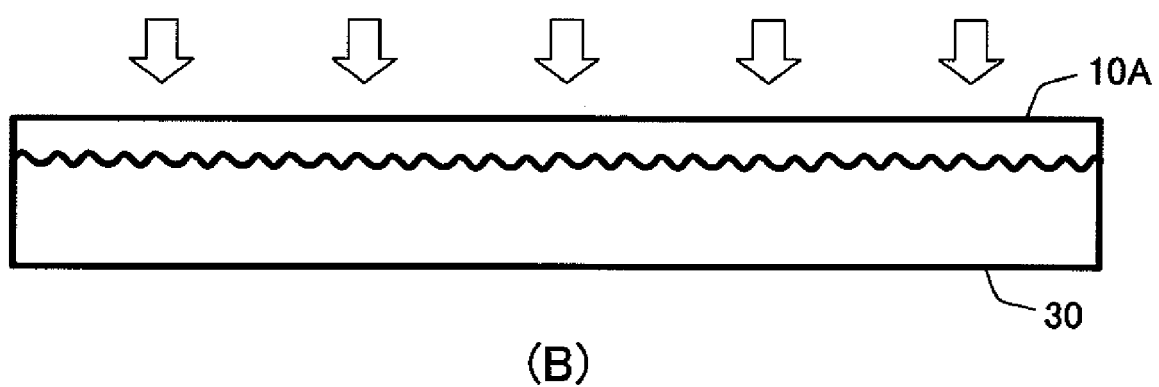

In the second example of the manufacturing method, a ceramic green sheet 10A and a sintering setter 30 are prepared as shown in (A) of FIG. 13. The sintering setter 30 has rise and fall (wave undulation) for forming the convex portions 11 and the concave portions 12. The rise and fall are formed on the upper surface of the sintering setter 30 by an appropriate technique such as grinding, polishing, or blasting process. Subsequently, the green sheet 10A is sintered under the predetermined sintering condition (e.g., at 1400° C. for one hour) while being pressed against the upper surface of the sintering setter 30 as shown in (B) of FIG. 13. As a result, the thin plate member 10 having the convex portions 11 and the concave portions 12, shown in FIG. 1, is formed.

Third Example of Manufacturing Method

Figure 14:
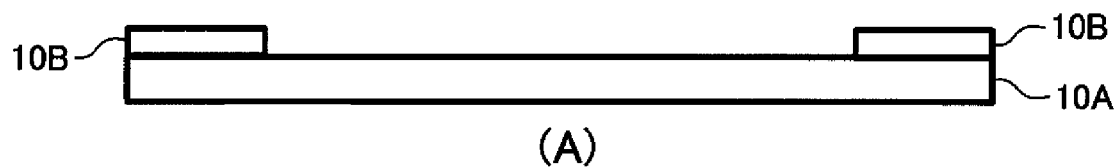
FIG. 14 is a process drawing of a third example of a manufacturing method of the thin plate member according to the present invention.
Figure 14:
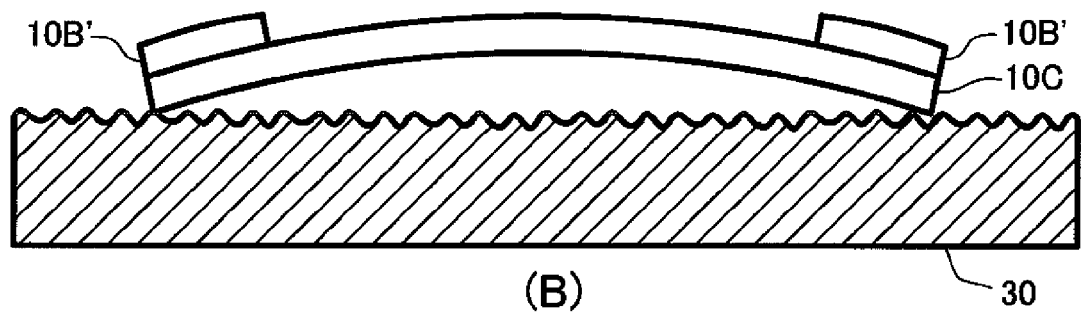
Figure 14:
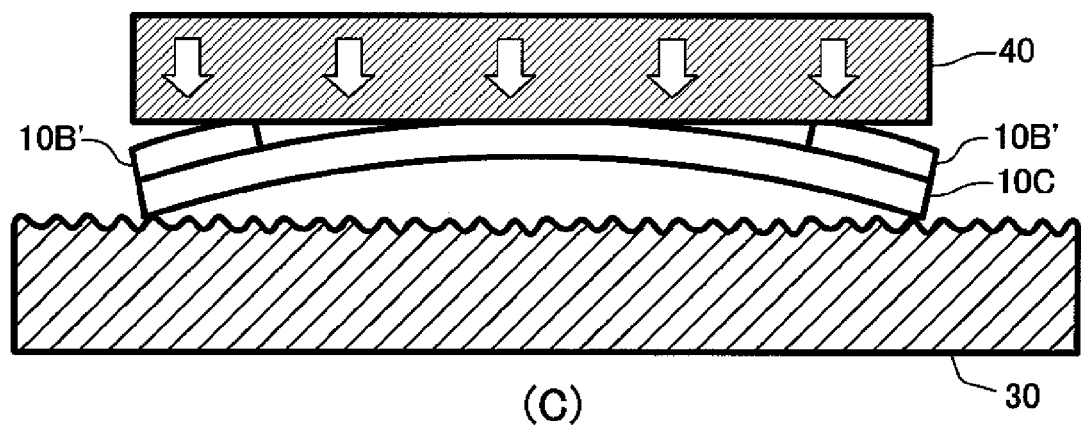
Figure 14:
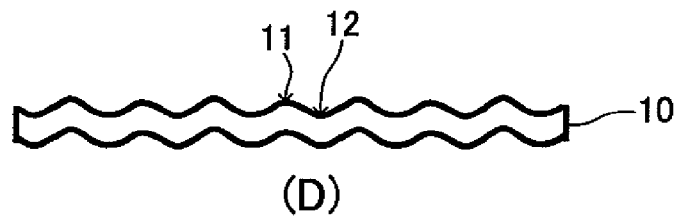

In the third example of the manufacturing method, the ceramic green sheet 10A is prepared, and presintered ceramic small pieces 10B are formed on one side of and at both ends of the green sheet 10A (or peripheral portion of the green sheet 10A) by printing as shown in (A) of FIG. 14. The presintered ceramic small pieces 10B are made of the ceramic that is the same type of the green sheet 10A.

Next, the green sheet 10A and the presintered ceramic small piece 10B are sintered under a predetermined sintering condition (e.g., at 1400° C. for one hour). As a result, the green sheet 10A is warped to be the thin plate member 10C as shown in (B) of FIG. 14, due to the difference in contraction between the green sheet 10A and the presintered ceramic small piece 10B. It is to be noted that the difference in contraction by sintering between the green sheet 10A and the presintered ceramic small piece 10B can easily be controlled by, for example, using materials each having a particle with different diameter.

Subsequently, as shown in (C) of FIG. 14, a weight 40 is placed onto the thin plate member 10C in order to correct the warpage of the thin plate member 10C, and with keeping this state (i.e., the thin plate member 10 is pressed downward so as to stretch the thin plate member 10C by the weight 40), the thin plate member 10C is sintered under the predetermined sintering condition (e.g., the thin plate member 10C is placed onto the setter 30 having formed thereon rise and fall for forming the convex portions 11 and the concave portions 12, the weight 40 of 300 g made of alumina is put on the thin plate member 10C, and with keeping this state, the thin plate member 10C is sintered at 1400° C. for one hour). As a result, the thin plate member 10 having the convex portions 11 and the concave portions 12, shown in FIG. 1, is formed as shown in (D) of FIG. 14.

The thin plate member 10C having a warp (warpage), as shown in (B) of FIG. 14, can also be obtained by sintering the green sheet 10A under a predetermined condition without printing the presintered ceramic 10B on the green sheet 10A. Specifically, for instance, if the green sheet 10A is sintered while the green sheet 10A is placed on the setter that is hollowed out at its central portion (i.e., on the setter having only the outer frame of four sides), the central portion of the green sheet 10A is deflected by its own weight, so that the thin plate member 10C having the warp (warpage) in such a manner that the central portion is caved in can be obtained after the sintering. Thereafter, the thin plate member 10 can also be manufactured by the same manner as in the third example of the manufacturing method.

(First Modification)

Figure 15:
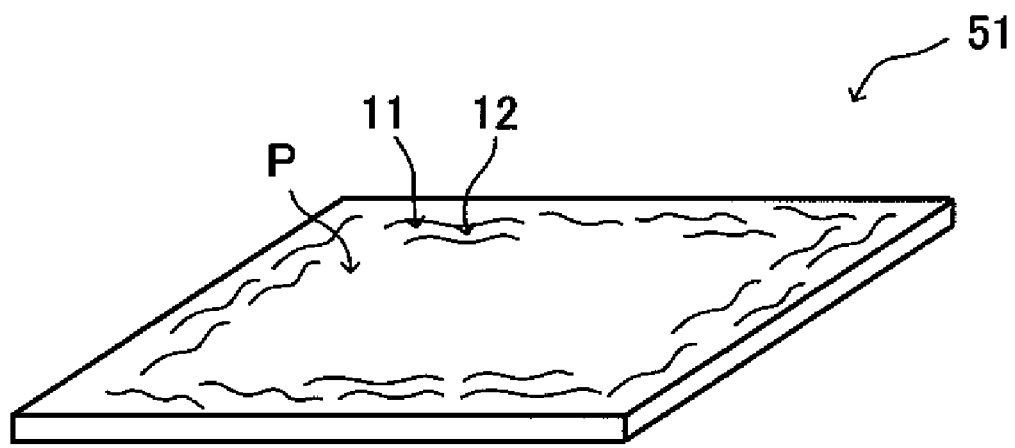
FIG. 15 is a perspective view of a first modification of the thin plate member according to the present invention.

Subsequently, various modifications of the thin plate member according to the present invention will be explained. As shown in FIG. 15, a thin plate member 51 according to a first modification of the present invention has convex portions 11 and concave portions 12 only at the peripheral portion of the thin plate member 51. When a load is applied to the thin plate member 51 under the condition same as that explained with reference to FIGS. 6 to 8 (the length of the beam L=40 mm, depth b=30 mm, thickness t=30 μm, material is zirconia), and the load F necessary for deflecting the thin plate member 51 by 1 mm (y=1 mm) is actually measured, the load F is 50.2 gram-weights. Even in case where the convex portions 11 and the concave portions 12 are formed only at the peripheral portion of the thin plate member 51 as described above, it can be understood that a thin plate member, which is extremely difficult to be deformed by external force compared to the virtual thin plate member without having the convex portions 11 and the concave portions 12, can be provided.

(Second Modification)

Figure 16:
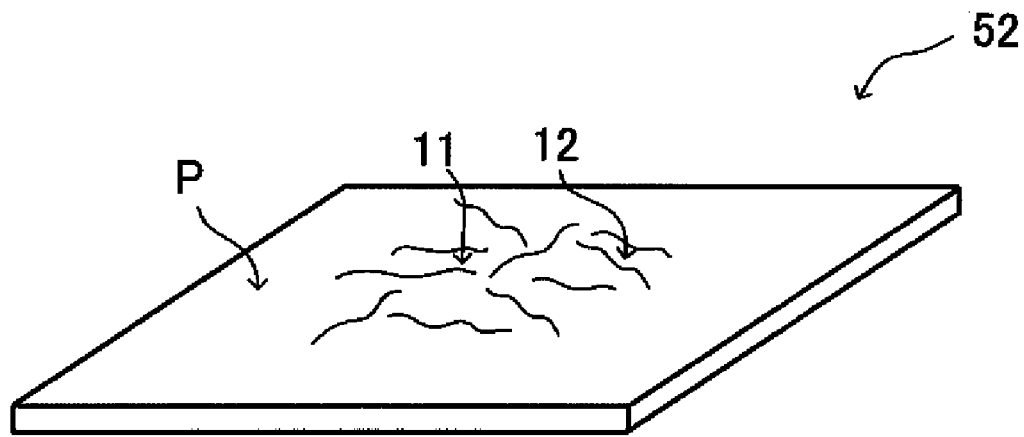
FIG. 16 is a perspective view of a second modification of the thin plate member according to the present invention.

As shown in FIG. 16, a thin plate member 52 according to the second modification has the convex portions 11 and the concave portions 12 only at the central portion thereof.

(Third Modification)

Figure 17:
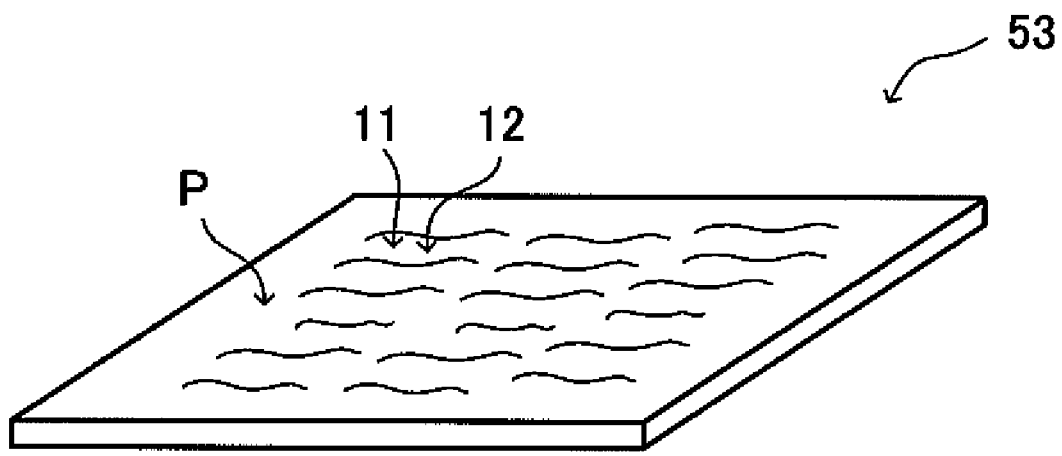
FIG. 17 is a perspective view of a third modification of the thin plate member according to the present invention.

As shown in FIG. 17, a thin plate member 53 according to the third modification has mountain-range convex portions 11 and groove-like concave portions 12 aligned with directivity (aligned in the same direction).

(Fourth Modification)

Figure 18:
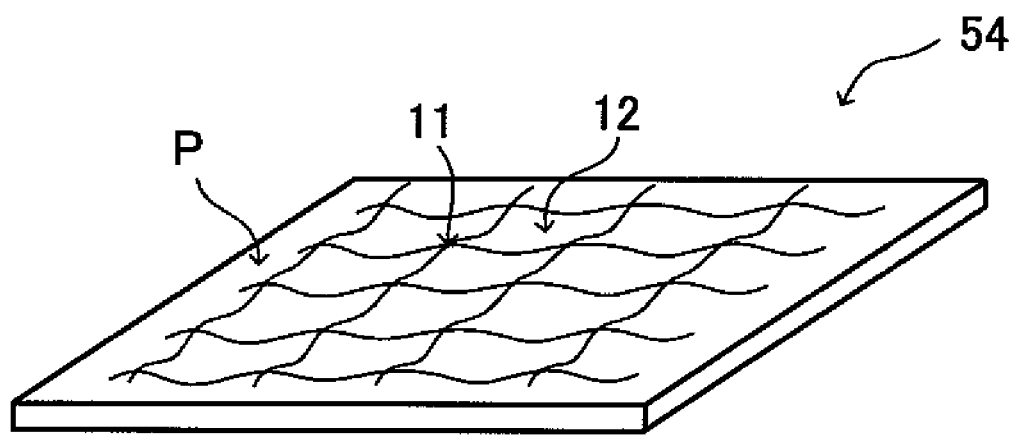
FIG. 18 is a perspective view of a fourth modification of the thin plate member according to the present invention.

As shown in FIG. 18, a thin plate member 54 according to the fourth modification of the present invention has convex portions 11 and concave portions 12 regularly and alternately aligned (that is, it has the convex portions 11 and the concave portions 12 along the mesh shape). In other words, the ridge of the corrugated wrinkles may be formed along the square lattice.

It should be noted that the thin plate members 51 to 54 in the first to fourth modifications can also be manufactured easily by appropriately setting the shape of the rise and fall formed on the upper surface of the mold 20 in the first example of the manufacturing method or the shape of the rise and fall formed on the upper surface of the sintering setter in the second example of the manufacturing method.

For example, the thin plate member 54 shown in FIG. 18 can be manufactured by using a metallic mesh as the mold 20 in the first example of the manufacturing method explained with reference to FIG. 12. More specifically, the ceramic green sheet 10A and the mold 20 made of a metallic mesh are pressed against each other, while applying a load of about 5 to 100 kgf/cm$^2$, for example. Accordingly, the concave portions and convex portions along the mesh shape can be formed on the surface of the ceramic green sheet 10A. The depth of each of the concave portions and the convex portions can be controlled by the load. Then, the green sheet 10A is sintered as described above. As a result, the thin plate member 54 shown in FIG. 18 having the convex portions 11 and the concave portions 12 can easily be manufactured.

(Fifth Modification)

Figure 19:
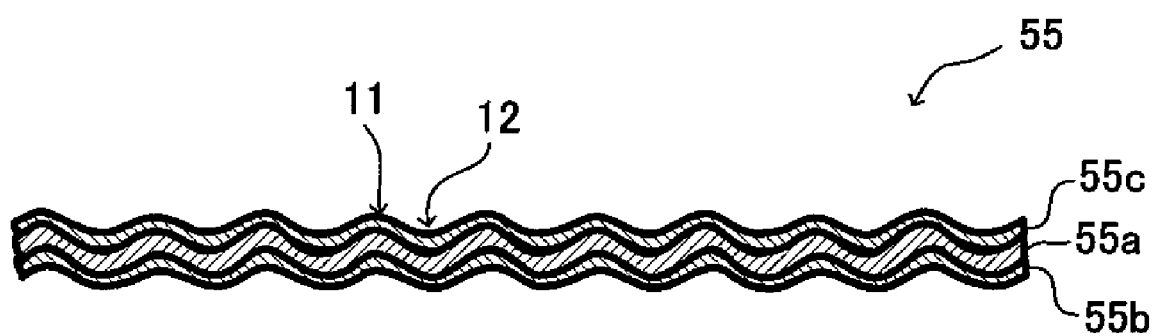
FIG. 19 is a perspective view of a fifth modification of the thin plate member according to the present invention.

As shown in FIG. 19, a thin plate member 55 according to the fifth modification of the present invention is a laminate member of a ceramic sheet 55a, and sheets 55b and 55c which are made of a material having a thermal expansion coefficient different from that of the ceramic sheet 55a. In this example, the ceramic sheet 55a is a solid electrolyte zirconia (YSZ: yttria-stabilized zirconia). The sheet 55b is a fuel electrode formed on one surface of the solid electrolyte zirconia 55a. This fuel electrode is composed of Ni+YSZ cermet, and is porous. The sheet 55c is an air electrode formed on the other surface of the solid electrolyte zirconia 55a. This air electrode is composed of LSM (La(Sr)MnO$_3$: lanthanum strontium manganate), and is porous. Therefore, the thin plate member 55 is used as a unit cell of an SOFC (solid oxide fuel cell).

The thin plate member 55 is formed as follows. That is, a ceramic sheet (zirconia tape) 55a formed by a green sheet method is sintered at 1400° C. for one hour to obtain a sintered body. Then, a sheet (a layer which will become the fuel electrode) 55b is formed on the lower surface of the sintered body by a printing method, and then, the resultant is sintered at 1400° C. for one hour. Further, a sheet (a layer which will become the air electrode) 55c is formed on the upper surface of the sintered body by a printing method, and then, the resultant is sintered at 1200° C. for one hour, whereby the thin plate member 55 is formed. In the thin plate member 55, the thickness of the ceramic sheet (dense zirconia solid electrolyte layer) 55a is set to 30 μm, the thickness of the sheet (fuel electrode layer) 55b is set to 10 μm, and the thickness of the sheet (air electrode layer) 55c is set to 10 μm. The size of the thin plate member 55 is 30 mm×30 mm.

It should be mentioned that the thermal expansion coefficient of the YSZ constituting the ceramic sheet (dense zirconia solid electrolyte layer) 55a, the thermal expansion coefficient of the Ni+YSZ cermet constituting the sheet (fuel electrode layer) 55b, and the thermal expansion coefficient of the LSM constituting the sheet (air electrode layer) 55c are different from one another. Therefore, since there are differences in sintering contraction and a difference in thermal expansion when they are sintered, a warp (a warpage) is produced on the substrate due to a residual stress after the sintering. Thus, thereafter, the "corrugated wrinkles" can be formed by, for example, the third example of the manufacturing method.

It should also be noted that the sheet (the layer which will become the fuel electrode) 55b may be formed on one surface of the zirconia tape 55a by a printing method, and thereafter, the resultant may be sintered at 1400° C. for one hour, and then, the sheet (which will become the air electrode layer) 55c may be formed by the aforesaid method. Alternatively, the zirconia tape 55a and the tape 55b which will be the fuel electrode layer may be integrally laminated, and sintered at 1400° C. for one hour, and then, the sheet (which will be the air electrode layer) 55c may be formed by the aforesaid method.

Just like the thin plate member 55 in this embodiment, if the thin plate member is a laminate member of the ceramic sheet and the sheet made of a material having a thermal expansion coefficient different from that of the ceramic sheet, this thin plate member is difficult to be deformed by not only the external force but also the internal stress even if internal stress occurs. Specifically, when the thin plate member 55, which is such a laminate member, is held under a high-temperature environment, or the thin plate member 55 is used under the environment where the temperature difference is applied to the thin plate member 55 (e.g., under the environment where one surface is heated), internal stress caused by the difference in the thermal expansion coefficient between the layers occurs. However, since the thin plate member 55 has plural concave portions 11 and convex portions 12, the thin plate member 55 is difficult to be deformed (can not be easily deformed) even if the internal stress occurs.

As explained above, the thin plate member according to the embodiment and modifications of the present invention has the convex portions and concave portions, so that it is difficult to be deformed compared to a thin plate member (virtual thin plate member) of the same type having no concave portion and convex portion. Accordingly, the use of the thin plate member can provide a device that is easy to show a desired performance even when external force is applied to the thin plate member, or a device that is easy to be manufactured.

The present invention is not limited to the above-described each embodiment, and various modifications are possible within the scope of the present invention. For example, each of the thin plate members described above may be made of a normal ceramic such as alumina, etc. Further, each of the thin plate member described above may be ceramic having high thermal shock resistance, such as silicon nitride or silicon carbide, and may be yttria partially stabilized zirconia. Furthermore, each of the thin plate members seen in a plan view are not limited to have a square or rectangular shape, but may have a shape of regular polygon including these, polygon, circle, ellipse, and the like.

In the thin plate member 55 according to the fifth modification, the sheet (fuel electrode layer) 55b can be made of platinum, platinum-zirconia cermet, platinum-cerium oxide cermet, ruthenium, ruthenium -zirconia cermet, and the like.

The sheet (air electrode layer) 55c can be made of, for instance, perovskite complex oxide containing lanthanum (e.g., the aforesaid lanthanum manganite, lanthanum cobaltite). The lanthanum cobaltite and lanthanum manganite may be doped with strontium, calcium, chrome, cobalt (in the case of lanthanum manganite), iron, nickel, aluminum, or the like. Further, it may be palladium, platinum, ruthenium, platinum-zirconia cermet, palladium-zirconia cermet, ruthenium-zirconia cermet, platinum-cerium oxide cermet, palladium-cerium oxide cermet, and ruthenium -cerium oxide cermet.

In addition, although the thin plate member 55 in the fifth modification is a laminate member having three layers, it may be a laminate member having two, three, or more layers (e.g., four to seven layers).

What is claimed is:

1. A sintered thin plate member that comprises at least a ceramic sheet, having a uniform thickness of not less than 5 μm and not more than 100 μm, and includes plural convex portions protruding from a plane of the thin plate member and plural concave portions caved in from said plane, wherein
    at least one of the plural convex portions is formed such that a top positioned at the uppermost point of the convex portion continuously extends in the direction along said plane and directly joins an adjacent one of the plural concave portions, which is formed such that a bottom positioned at an uppermost point of the concave portion continuously extends in the direction along said plane,
    wherein a top-bottom average distance, which is a sum of the top distance average value obtained by simply averaging the distances from the tops positioned at the uppermost point of the plural convex portions to said plane and a bottom distance average value obtained by simply averaging the distances from the bottoms positioned at the uppermost point of the plural concave portions to said plane, is not less than 20 μm and not more than 400 μm, including
    at least a pair of the convex portion and concave portion, which is composed of one of the plural convex portions and one of the plural concave portions adjacent to the one convex portion, in which the distance between the top of the one convex portion and the bottom of the one concave portion in the direction along the plane is not less than 0.05 mm and not more than 1.00 mm, and
    a deflection amount obtained when the thin plate member is supported at a predetermined support section of the thin plate member and a load having a predetermined magnitude is applied to a load applying section, which is other than the support section, of the thin plate member in a direction orthogonal to said plane is smaller than a deflection amount obtained when the thin plate member, which is supposed to be flat without having the convex portion and the concave portion, is supported at the support section thereof and the load having the predetermined magnitude is applied to the load applying section of the supposed thin plate member in the direction orthogonal to the plane.

2. A sintered thin plate member according to claim 1, wherein the thin plate member is composed of a single ceramic sheet.

3. A sintered thin plate member according to claim 1, wherein the thin plate member has plural convex portions protruding from said plane of the thin plate member and plural concave portions caved in from said plane, in such a manner that the distribution of the convex portions and concave portions on said plane is substantially uniform.

4. A sintered thin plate member according to claim 1, wherein the thin plate member has the convex portions and the concave portions only at a central portion of the thin plate member.

5. A sintered thin plate member according to claim 1, wherein the thin plate member has mountain-range convex portions and groove-like concave portions aligned substantially in the same direction.

6. A sintered thin plate member that comprises a laminate member comprising a ceramic sheet and a sheet made of a material having a thermal expansion coefficient different from that of the ceramic sheet, having a uniform thickness of not less than 5 μm and not more than 100 μm, and includes plural convex portions protruding from a plane of the thin plate member and plural concave portions caved in from said plane., wherein
    at least one of the plural convex portions is formed such that a top positioned at the uppermost point of the convex portion continuously extends in the direction along said plane and directly joins an adjacent one of the plural concave portions, which is formed such that a bottom positioned at an uppermost point of the concave portion continuously extends in the direction along said plane, and
    a deflection amount obtained when the thin plate member is supported at a predetermined support section of the thin plate member and a load having a predetermined magnitude is applied to a load applying section, which is other than the support section, of the thin plate member in a direction orthogonal to said plane is smaller than a deflection amount obtained when the thin plate member, which is supposed to be flat without having the convex portion and the concave portion, is supported at the support section thereof and the load having the predetermined magnitude is applied to the load applying section of the supposed thin plate member in the direction orthogonal to the plane.

7. A sintered thin plate member according to claim 6, wherein the ceramic sheet is a solid electrolyte zirconia, a fuel electrode is formed on one surface of the solid electrolyte zirconia as the sheet made of the material having a different thermal expansion coefficient, and an air electrode is formed on the other surface of the solid electrolyte zirconia as the sheet made of the material having the different thermal expansion coefficient.

8. A sintered thin plate member according to claim 6, wherein the thin plate member has plural convex portions protruding from said plane of the thin plate member and plural concave portions caved in from said plane, in such a manner that the distribution of the convex portions and concave portions on said plane is substantially uniform.

9. A sintered thin plate member according to claim 6, wherein the thin plate member has the convex portions and the concave portions only at a central portion of the thin plate member.

10. A sintered thin plate member according to claim 6, wherein the thin plate member has mountain-range convex portions and groove-like concave portions aligned substantially in the same direction.

11. A sintered thin plate member that comprises at least a ceramic sheet, having a uniform thickness of not less than 5 μm and not more than 100 μm, and includes plural convex portions protruding from a plane of the thin plate member and plural concave portions caved in from said plane,
wherein the convex portions and the concave portions are formed only at the peripheral portion of the thin plate member,
wherein at least one of the plural convex portions is formed such that a top positioned at the uppermost point of the convex portion continuously extends in the direction along said plane and directly joins an adjacent one of the plural concave portions, which is formed such that a bottom positioned at an uppermost point of the concave portion continuously extends in the direction along said plane, and
a deflection amount obtained when the thin plate member is supported at a predetermined support section of the thin plate member and a load having a predetermined magnitude is applied to a load applying section, which is other than the support section, of the thin plate member in a direction orthogonal to said plane is smaller than a deflection amount obtained when the thin plate member, which is supposed to be flat without having the convex portion and the concave portion, is supported at the support section thereof and the load having the predetermined magnitude is applied to the load applying section of the supposed thin plate member in the direction orthogonal to the plane.

12. A sintered thin plate member according to claim 11, wherein a top-bottom average distance, which is a sum of the top distance average value obtained by simply averaging the distances from the tops positioned at the uppermost point of the plural convex portions to said plane and a bottom distance average value obtained by simply averaging the distances from the bottoms positioned at the uppermost point of the plural concave portions to said plane, is not less than 20 μm and not more than 400 μm.

13. A sintered thin plate member according to claim 12, including at least a pair of the convex portion and concave portion, which is composed of one of the plural convex portions and one of the plural concave portions adjacent to the one convex portion, in which the distance between the top of the one convex portion and the bottom of the one concave portion in the direction along the plane is not less than 0.05 mm and not more than 1.00 mm.

14. A sintered thin plate member according to claim 11, wherein the thin plate member is composed of a single ceramic sheet.

15. A sintered thin plate member according to claim 11, wherein the thin plate member is a laminate member comprising a ceramic sheet and a sheet made of a material having a thermal expansion coefficient different from that of the ceramic sheet.

16. A sintered thin plate member according to claim 15, wherein the ceramic sheet is a solid electrolyte zirconia, a fuel electrode is formed on one surface of the solid electrolyte zirconia as the sheet made of the material having a different thermal expansion coefficient, and an air electrode is formed on the other surface of the solid electrolyte zirconia as the sheet made of the material having the different thermal expansion coefficient.

17. A sintered thin plate member that comprises at least a ceramic sheet, having a uniform thickness of not less than 5 μm and not more than 100 μm, and includes plural convex portions protruding from a plane of the thin plate member and plural concave portions caved in from said plane,
wherein the thin plate member has convex portions and concave portions regularly and alternately aligned along a mesh shape,
wherein at least one of the plural convex portions is formed such that a top positioned at the uppermost point of the convex portion continuously extends in the direction along said plane and directly joins an adjacent one of the plural concave portions, which is formed such that a bottom positioned at an uppermost point of the concave portion continuously extends in the direction along said plane, and
a deflection amount obtained when the thin plate member is supported at a predetermined support section of the thin plate member and a load having a predetermined magnitude is applied to a load applying section, which is other than the support section, of the thin plate member in a direction orthogonal to said plane is smaller than a deflection amount obtained when the thin plate member, which is supposed to be flat without having the convex portion and the concave portion, is supported at the support section thereof and the load having the predetermined magnitude is applied to the load applying section of the supposed thin plate member in the direction orthogonal to the plane.

18. A sintered thin plate member according to claim 17, wherein a top-bottom average distance, which is a sum of the top distance average value obtained by simply averaging the distances from the tops positioned at the uppermost point of the plural convex portions to said plane and a bottom distance average value obtained by simply averaging the distances from the bottoms positioned at the uppermost point of the plural concave portions to said plane, is not less than 20 μm and not more than 400 μm.

19. A sintered thin plate member according to claim 18, including at least a pair of the convex portion and concave portion, which is composed of one of the plural convex portions and one of the plural concave portions adjacent to the one convex portion, in which the distance between the top of the one convex portion and the bottom of the one concave portion in the direction along the plane is not less than 0.05 mm and not more than 1.00 mm.

20. A sintered thin plate member according to claim 17, wherein the thin plate member is composed of a single ceramic sheet.

21. A sintered thin plate member according to claim 17, wherein the thin plate member is a laminate member comprising a ceramic sheet and a sheet made of a material having a thermal expansion coefficient different from that of the ceramic sheet.

22. A sintered thin plate member according to claim 21, wherein the ceramic sheet is a solid electrolyte zirconia, a fuel electrode is formed on one surface of the solid electrolyte zirconia as the sheet made of the material having a different thermal expansion coefficient, and an air electrode is formed on the other surface of the solid electrolyte zirconia as the sheet made of the material having the different thermal expansion coefficient.

* * * * *